US012625547B2

(12) United States Patent
Nowinski et al.

(10) Patent No.: US 12,625,547 B2
(45) Date of Patent: May 12, 2026

(54) DISPLAYING IN-VEHICLE MESSAGING AND ACTIVATING VEHICLE FUNCTIONS BASED ON DRIVER GAZE DIRECTION

(71) Applicant: Robert Bosch GmbH, Stuttgart (DE)

(72) Inventors: John Nowinski, Toledo, OH (US); Troy A. McCormick, Milford, MI (US); Tyler Warga, Milford, MI (US); Suman Yelati, Plymouth, MI (US); Dhanabal Arunachalam, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/590,573

(22) Filed: Feb. 28, 2024

(65) Prior Publication Data

US 2025/0271929 A1      Aug. 28, 2025

(51) Int. Cl.
| | |
|---|---|
| *G06F 3/01* | (2006.01) |
| *B60Q 9/00* | (2006.01) |

(52) U.S. Cl.
CPC ............... *G06F 3/013* (2013.01); *B60Q 9/00* (2013.01)

(58) Field of Classification Search
CPC .................................. G06F 3/013; B60Q 9/00
See application file for complete search history.

(56) References Cited

U.S. PATENT DOCUMENTS

| | | | | |
|---|---|---|---|---|
| 4,973,149 | A | * | 11/1990 | Hutchinson ............... A61F 4/00 351/210 |
| 6,114,951 | A | * | 9/2000 | Kinoshita .............. G08G 1/166 340/904 |
| 6,200,139 | B1 | * | 3/2001 | Clapper ................. G09B 9/042 600/587 |
| 6,397,137 | B1 | * | 5/2002 | Alpert ...................... B60R 1/02 359/877 |
| 6,859,144 | B2 | * | 2/2005 | Newman ............... B60Q 9/008 382/104 |
| 9,925,920 | B2 | * | 3/2018 | Lei .......................... G08G 1/163 |
| 10,723,264 | B2 | * | 7/2020 | Fujisawa .............. B62D 15/025 |
| 10,810,966 | B1 | * | 10/2020 | Landgraf .............. H04N 7/188 |
| 10,852,822 | B2 | * | 12/2020 | Beineke ................. B60K 35/20 |
| 11,682,357 | B1 | * | 6/2023 | Seo ...................... G09G 3/3426 345/694 |
| 11,704,814 | B2 | * | 7/2023 | Arar ..................... G06N 3/0985 382/100 |

(Continued)

FOREIGN PATENT DOCUMENTS

| | | |
|---|---|---|
| CN | 114954481 A | 8/2022 |
| DE | 102015117610 A1 | 4/2017 |

(Continued)

OTHER PUBLICATIONS

International Search Report and Written Opinion for Application No. PCT/EP2025/053446 dated Apr. 22, 2025 (15 pages).

*Primary Examiner* — Benyam Ketema

(74) *Attorney, Agent, or Firm* — Michael Best & Friedrich LLP

(57) ABSTRACT

A system for controlling a vehicle operation based on a driver gaze direction includes a plurality of sensors and an electronic processor. The electronic processor is configured to determine a gaze direction of a driver using the plurality of sensors and selectively activating a vehicle function based on the gaze direction.

10 Claims, 6 Drawing Sheets

(56) References Cited

U.S. PATENT DOCUMENTS

| | | | | |
|---|---|---|---|---|
| 11,760,346 | B2* | 9/2023 | Hanna | B60W 30/0953 |
| | | | | 701/301 |
| 11,828,947 | B2* | 11/2023 | Park | B60K 35/50 |
| 2003/0039378 | A1* | 2/2003 | Yuasa | G06T 7/74 |
| | | | | 382/104 |
| 2004/0098462 | A1* | 5/2004 | Horvitz | G06Q 10/10 |
| | | | | 709/207 |
| 2004/0150514 | A1* | 8/2004 | Newman | B60Q 9/008 |
| | | | | 345/7 |
| 2004/0239509 | A1* | 12/2004 | Kisacanin | G01S 13/867 |
| | | | | 340/575 |
| 2006/0006988 | A1* | 1/2006 | Harter, Jr. | B60Q 9/008 |
| | | | | 348/148 |
| 2010/0039617 | A1* | 2/2010 | Martinez-Conde | A61B 3/113 |
| | | | | 351/209 |
| 2010/0289632 | A1* | 11/2010 | Seder | G01S 13/931 |
| | | | | 382/104 |
| 2012/0092173 | A1* | 4/2012 | Sanchez | B60W 50/14 |
| | | | | 340/576 |
| 2012/0146891 | A1* | 6/2012 | Kalinli | H04N 19/33 |
| | | | | 345/156 |
| 2014/0203928 | A1 | 7/2014 | Takikawa et al. | |
| 2015/0158427 | A1* | 6/2015 | Lee | B60Q 9/008 |
| | | | | 701/1 |
| 2015/0266486 | A1 | 9/2015 | Silvlin | |
| 2016/0320835 | A1* | 11/2016 | Kuehne | B60K 35/29 |
| 2017/0177076 | A1* | 6/2017 | Srail | B60W 50/10 |
| 2017/0192091 | A1* | 7/2017 | Felix | G01S 13/42 |
| 2017/0247031 | A1 | 8/2017 | Feit et al. | |
| 2018/0059773 | A1* | 3/2018 | Park | B60K 35/23 |
| 2018/0173975 | A1 | 6/2018 | Adibi et al. | |
| 2019/0049736 | A1* | 2/2019 | Tanriover | G06F 3/012 |
| 2019/0168586 | A1* | 6/2019 | Paepcke | B60K 35/415 |
| 2019/0236386 | A1 | 8/2019 | Yu et al. | |
| 2019/0256084 | A1 | 8/2019 | Lee et al. | |
| 2019/0256106 | A1 | 8/2019 | Lee et al. | |
| 2019/0318181 | A1* | 10/2019 | Katz | B60W 40/09 |
| 2019/0384387 | A1 | 12/2019 | Cleveland et al. | |
| 2020/0005060 | A1* | 1/2020 | Martin | G06V 40/197 |
| 2020/0019034 | A1* | 1/2020 | Lagowski | B60J 3/04 |
| 2020/0339143 | A1 | 10/2020 | Kozlowski et al. | |
| 2020/0391591 | A1* | 12/2020 | Kim | B60W 30/08 |
| 2021/0048884 | A1* | 2/2021 | Beineke | G06F 3/013 |
| 2021/0081689 | A1 | 3/2021 | Weyers et al. | |
| 2021/0247201 | A1* | 8/2021 | Hori | G01C 21/3673 |
| 2021/0334565 | A1* | 10/2021 | Roche | B60K 35/29 |
| 2021/0350703 | A1* | 11/2021 | Mackenzie | G06T 7/70 |
| 2021/0403002 | A1* | 12/2021 | Kim | B60W 40/09 |
| 2022/0118909 | A1 | 4/2022 | Kang | |
| 2022/0169173 | A1 | 6/2022 | Yoo et al. | |
| 2022/0413604 | A1 | 12/2022 | Kim et al. | |
| 2023/0066459 | A1 | 3/2023 | Kobayashi | |
| 2023/0322215 | A1* | 10/2023 | Patel | B60K 35/22 |
| | | | | 701/26 |
| 2024/0367645 | A1 | 11/2024 | Sasmal | |

FOREIGN PATENT DOCUMENTS

| | | | |
|---|---|---|---|
| DE | 102021104080 | A1 | 8/2022 |
| DE | 102021207639 | A1 | 1/2023 |
| KR | 20230001616 | A | 1/2023 |

* cited by examiner

DISPLAYING IN-VEHICLE MESSAGING AND ACTIVATING VEHICLE FUNCTIONS BASED ON DRIVER GAZE DIRECTION

SUMMARY

Modern vehicles include various human machine interfaces (HMIs) to communicate data to and, in some cases, receive inputs from vehicle drivers and occupants. Examples of HMIs include head units, instrument clusters, head-up displays (HUDs), and mirrors with lighting or other display components (rear view and side view). In some instances, HMIs include touch control, voice control, and haptic feedback. HMIs provide vehicle information to drivers and passengers, such as, vehicle speed, internal vehicle warnings (e.g., low fuel), external vehicle warnings (e.g., occupied blind spot, pedestrians nearby), map information, directions, music information, and other information. In some instances, all or a combination of these features are included in a vehicle and or vehicle system, for example, an advanced driver assistance system.

One example implementation provides a system for controlling a vehicle operation based on a driver gaze direction and the system includes a plurality of sensors and an electronic processor. The electronic processor is configured to determine a gaze direction of a driver using the plurality of sensors and selectively activating a vehicle function based on the gaze direction.

The electronic processor is further configured to detect a vehicle hazard and activate a warning indicator associated with the vehicle hazard. The warning indicator includes a normal display mode and an augmented display mode.

The electronic processor is further configured to activate the normal display mode when the gaze direction is in a same gaze zone as the warning indicator.

The electronic processor is further configured to activate the augmented display mode when the gaze direction is in a different gaze zone than the warning indicator.

The electronic processor is further configured to determine when the gaze direction is moved to the same gaze zone as the warning indicator.

The electronic processor is further configured to de-activate the augmented display mode when the gaze direction is moved to the same gaze zone as the warning indicator.

The electronic processor is further configured to determine when the gaze direction is moved to an activation zone and determine when a gaze duration exceeds an activation duration.

The electronic processor is further configured to activate a function associated with the activation zone.

The electronic processor is further configured to determine when the gaze direction is moved away from the activation zone and determine when a gaze duration exceeds a de-activation duration.

The electronic processor is further configured to de-activate the function associated with the activation zone when the gaze duration exceeds the de-activation duration.

Another example implementation provides a system for controlling a vehicle operation based on a driver gaze direction and the system includes a plurality of sensors and an electronic processor. The electronic processor is configured to determine a gaze direction of a driver using the plurality of sensors, detect a vehicle hazard, and activate a warning indicator associated with the vehicle hazard, wherein the warning indicator includes a normal display mode and an augmented display mode.

The electronic processor is further configured to activate the normal display mode when the gaze direction is in a same gaze zone as the warning indicator.

The electronic processor is further configured to activate the augmented display mode when the gaze direction is in a different gaze zone than the warning indicator.

The augmented display mode includes an increased size of the warning indicator, an increased brightness of the warning indicator, a color change of the warning indicator, an additional indicator around or adjacent the warning indicator, or any combination thereof.

The electronic processor is further configured to determine when the gaze direction is moved to the same gaze zone as the warning indicator.

The electronic processor is further configured to de-activate the augmented display mode when the gaze direction is moved to the same gaze zone as the warning indicator.

Still another example implementation provides a system for controlling a vehicle operation based on a driver gaze direction and the system includes a plurality of sensors and an electronic processor. The electronic processor configured to determine a gaze direction of a driver using the plurality of sensors, determine when the gaze direction is moved to an activation zone, and activate a function associated with the activation zone.

The electronic processor is further configured to determine when a gaze duration exceeds an activation duration before activating the function associated with the activation zone.

The electronic processor is further configured to determine when the gaze direction is moved away from the activation zone.

The electronic processor is further configured to determine when a gaze duration exceeds a de-activation duration and de-activate the function associated with the activation zone when the gaze duration exceeds the de-activation duration.

DETAILED DESCRIPTION

Figure 1:
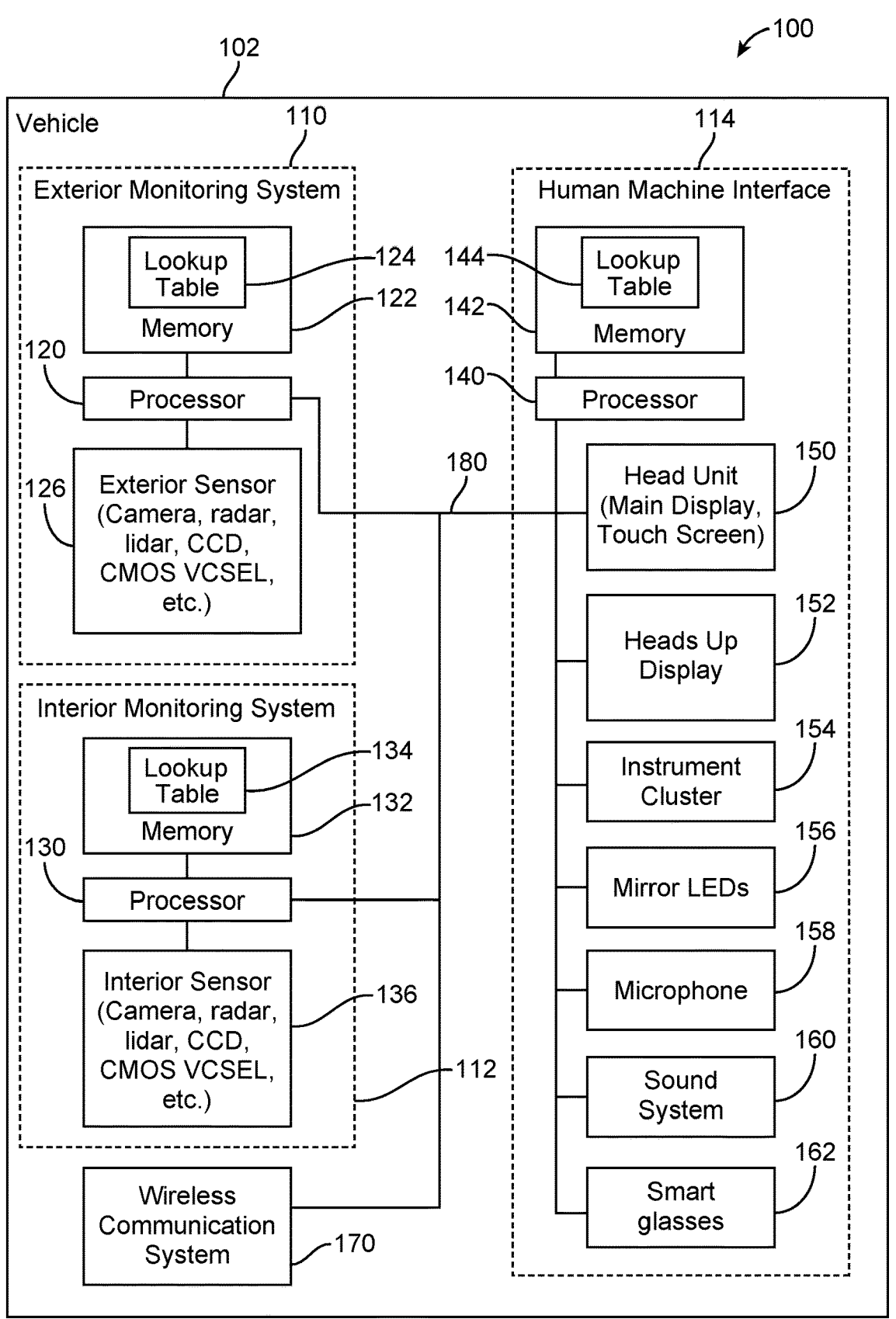
FIG. 1 is a schematic diagram of a decentralized vehicle operating system.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1 illustrates an example system 100 of displaying in-vehicle messaging and activating vehicle functions based on driver gaze direction. In the example shown, the system 100 resides in a vehicle 102 and includes an exterior monitoring system 110, an interior monitoring system 112, and a human machine interface 114. The exterior monitoring system 110 includes an electronic processor 120 connected to a memory 122. In one example, the memory 122 includes a lookup table 124 that stores values related the space surrounding the vehicle, e.g., related to the detection of other vehicles adjacent the sides, front, or rear of the vehicle 102. In some instances, other data structures to store and access data are used in place of or in addition to a lookup table. As further shown, the exterior monitoring system 110 also includes an exterior sensor 126 coupled to the electronic processor 120. In some instances, more than one exterior sensor is used and the exterior sensors may be placed on front of the vehicle 102, on the rear of the vehicle 102, on each side of the vehicle 102, at each corner of the vehicle 102, or any combination thereof. In some instances, the exterior sensor 126 includes or takes the form of a camera, a time-of-flight (ToF) sensor, a radar sensor, a lidar sensor, or a combination thereof. Further, the exterior sensor 126 can include a charge-coupled device (CCD), a complementary metal-oxide-sensor (CMOS), or a vertical-cavity surface-emitting laser (VCSEL).

In the example shown, the interior monitoring system 112 includes an electronic processor 130 connected to a memory 132. In one example, the memory 132 includes a lookup table 134 that stores values related to a driver gaze direction, i.e., the direction that a driver is looking relative to forward direction or direction in which the vehicle is moving and what actions are undertaken based on the driver gaze direction. In some instances, other data structures to store and access data are used in place of or in addition to a lookup table. As further shown, the interior monitoring system 112 also includes an interior sensor 136 coupled to the electronic processor 130. In some instances, more than one interior sensor is used. The interior sensor 136 may be similar to the exterior sensor 126, described above.

The interior sensor 136 is used to monitor the driver and the direction in which the driver is looking during operation of the vehicle 102 to determine a real-time gaze direction. The gaze direction is used to control how in-vehicle messages are provided to a driver. For example, if another vehicle is detected in a blind spot detection zone of the vehicle 102 by an exterior sensor 126, a warning, e.g., a warning LED, is displayed on a side view mirror adjacent the active blind spot detection zone. If the gaze direction of the driver is forward and not directed at the side view mirror, the warning is augmented, for example, by increasing the size of the warning by activating additional LEDs, by increasing the brightness of the warning LED, by changing a color of the warning LED, by activating additional LEDs around or adjacent the initial warning LED, or by any combination thereof.

In some implementations, the gaze direction is used to activate different functions provided by the system 100. For example, if a vehicle is pulling a trailer, a driver can activation a see-through trailer function by looking at the rear-view mirror (or rear-view display) for a predetermined, or driver set, period of time. The see-through trailer function uses cameras and projectors to project the area behind and around the rear of the vehicle 102 and trailer onto a display to allow the driver to see obstacles behind, and around, the vehicle 102 and trailer that would otherwise be hidden by the trailer. In short, the see-through trailer function essentially renders the trailer invisible on the display screen. In this example, the see-through trailer function remains active while the driver is looking at the rear-view display. If the driver looks away from the activation zone, e.g., the rear-view mirror (or rear-view display), for a predetermined, or driver set, period of time, the see-through trailer function is de-activated. In another example, a see-through hood function is provided and works in a similar manner to the see-through trailer function. In one example, a plurality of cameras and projectors are used to project the area below and around the front of the vehicle onto a display to allow the driver to see obstacles in front of, and around, the vehicle 102 that would otherwise be not be viewable due to the hood and front of the vehicle from the driver seat.

Other functions that can be activated using an extended gaze include a radio, a heads-up display, a dimmable rear-view mirror, a parking assist function, or a combination thereof. Each of these functions may be turned on or off with an extended gaze in the correct direction as determined and measured by the system 100.

As shown in FIG. 1, the human machine interface 114 includes an electronic processor 140 connected to a memory 142. The memory 142 includes a lookup table 144 (or other access and storage data structure) that stores values related to the driver gaze direction—similar to the lookup table 134, previously described. In the example shown, the human machine interface 114 also includes head unit 150 coupled to the processor 140. In some instances, the head unit 150 is the operational center of the human machine interface 114 and includes the main, or primary, display for presenting information to the driver and/or the passengers of the vehicle 102. The head unit 150 can also include a touch screen or physical buttons and knobs that the driver and/or occupants of the vehicle can use to provide inputs to the vehicle 102, such as, inputs related to heating/cooling, map destination inputs, radio inputs, telephone call inputs, text message inputs, etc. The head unit 150 can also be coupled to a back-up camera and can display images of areas and objects within the field of view of the back-up camera to the driver.

In one example, the human machine interface 114 includes a heads up display 152 that projects relevant vehicle information, e.g., speed, onto the vehicle windshield within or near the driver's line of sight in the direction of travel during vehicle operation. The human machine interface 114 also includes an instrument cluster 154. In one example, the instrument cluster 154 is a digital instrument cluster that includes, for example, a virtual speedometer, a virtual tachometer, a virtual odometer, a clock, an engine temperature gauge, a fuel gauge, a range indicator, various vehicle warning indicators, or any combination thereof. The human machine interface 114 also includes a plurality of mirror lights, for example light emitting diodes (LEDs) 156. The mirror LEDs 156, for example, can include a left side view mirror LED, a right-side view mirror LED, a rear-view mirror LED, or a combination thereof. In some instances, the mirror LEDs 156 are LEDS that are embedded in a respective mirror and light up to indicate a warning or provide other information to the driver.

In the example shown, the human machine interface 114 includes a microphone 158 through which voice commands are input to the human machine interface 114 and a sound system 160 through which music, directions, warnings, and other audible indicators are provided to the driver. The human machine interface 114 also includes smart glasses 162 that may be worn by the driver or passenger of the vehicle 102. FIG. 1 also shows that the system 100 includes a wireless communication system 170 that allows the vehicle 102 and the driver of the vehicle 102 to communicate wirelessly to other vehicles and other drivers. The various components of the system 100, along with other various modules and components are electrically and communicatively coupled to each other via direct connections or by or through one or more control or data buses (for example, the bus 180), which enable communication therebetween. In some instances, the bus 180 is a Controller Area Network (CAN™) bus. In some instances, the bus 180 is an automotive Ethernet™, a FlexRay™ communications bus, or another suitable bus. In alternative instances, some or all of the components of the system 100 may be communicatively coupled using suitable wireless modalities (for example, Bluetooth™ M or near field communication connections).

Figure 2:
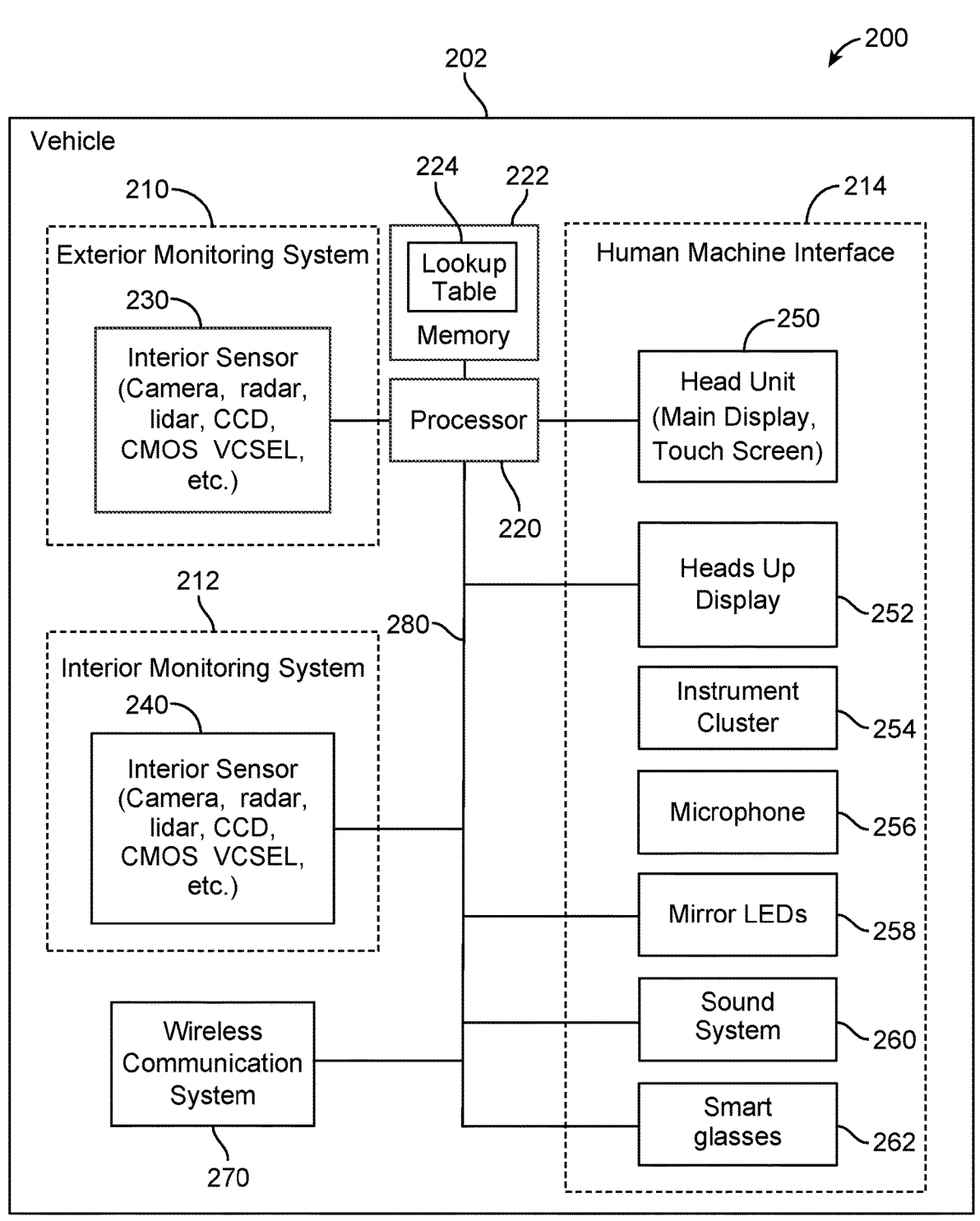
FIG. 2 is a schematic diagram of a centralized vehicle operating system.

FIG. 2 illustrates another example system 200 of displaying in-vehicle messaging and activating vehicle functions based on driver gaze direction. In the example shown, the system 200 resides in a vehicle 202 and includes an exterior monitoring system 210, an interior monitoring system 212, and a human machine interface 214 connected to an electronic processor 220 having a memory 222 connected thereto. In one example, the memory 222 includes a lookup table 224 that stores values related to the space surrounding the vehicle, e.g., related to the detection of other vehicles adjacent the sides, front, or rear of the vehicle 202. In some instances, other data structures to store and access data are used in place of or in addition to a lookup table.

In the example shown, the exterior monitoring system 210 includes an exterior sensor 230 coupled to the electronic processor 220. The exterior sensor 230 is configured in the same manner and takes the same form as the exterior sensor 126, described above. The interior monitoring system 212 also includes an interior sensor 240 coupled to the electronic processor 220. In some instances, more than one interior sensor is used. The interior sensor 240 may be similar to the exterior sensor 230, described above.

In the example shown in FIG. 2, the human machine interface 214 includes a head unit 250, a heads-up display 252, an instrument cluster 254, a microphone 256, a plurality of mirror LEDs 258, a sound system 260, and smart glasses 262 coupled to the processor 220. The head unit 250, heads up display 252, instrument cluster 254, microphone 256, plurality of mirror LEDs 258, sound system 260, and smart glasses 262 are the same as the head unit 150, heads up display 152, instrument cluster 154, mirror LEDs 156, microphone 158, sound system 160, and smart glasses 162 described above.

FIG. 2 also shows that the system 200 includes a wireless communication system 270 that allows the vehicle 202 and the driver of the vehicle 202 to communicate wirelessly to other vehicles and other drivers. The various components of the system 200, along with other various modules and components are electrically and communicatively coupled to each other via direct connections or by or through one or more control or data buses (for example, the bus 280), which enable communication therebetween. The bus 280 is the same as the previously described bus 180.

Figure 3:
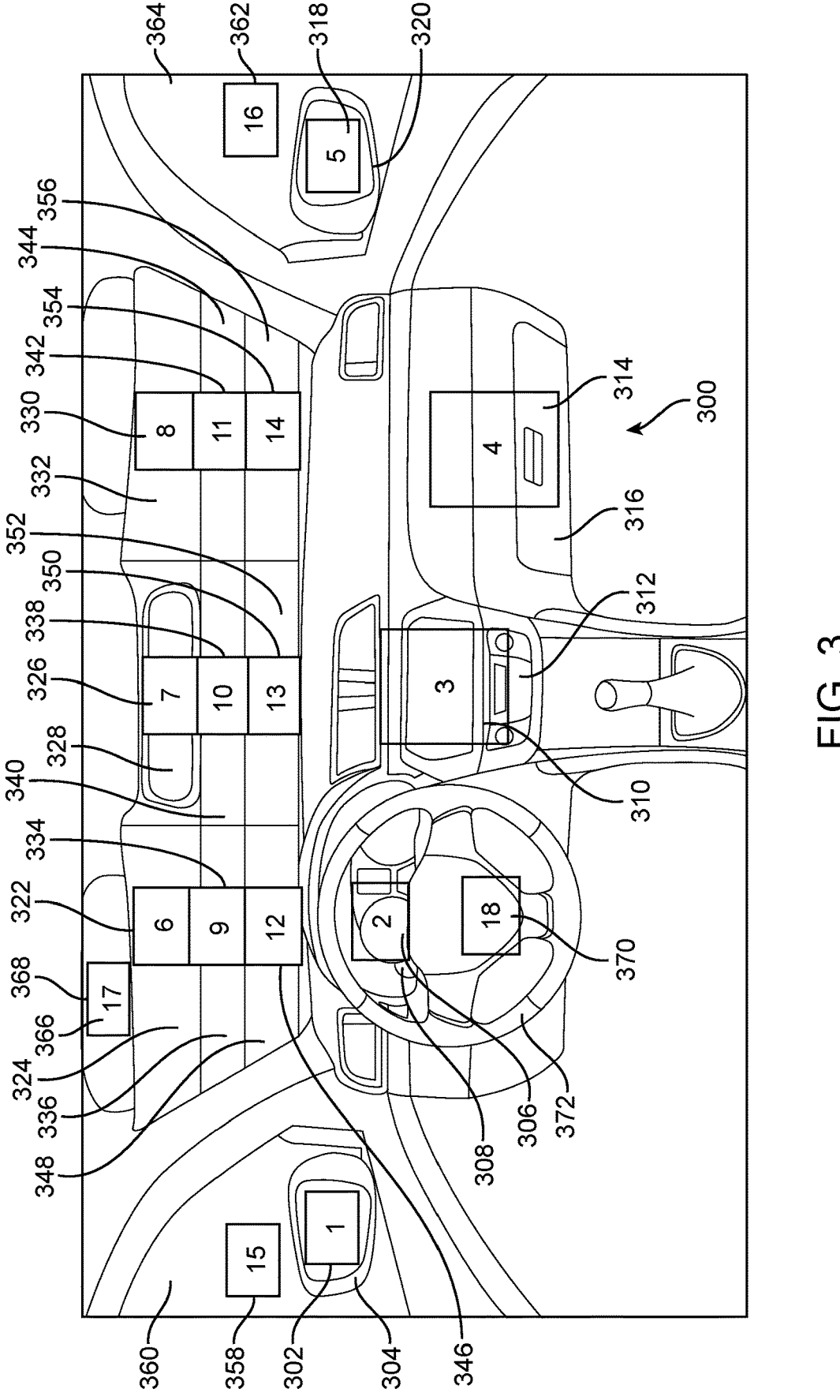
FIG. 3 is a diagram of a forward portion of a vehicle cockpit.

Referring now to FIG. 3 a forward portion of a vehicle cockpit is illustrated and is generally designated 300. As depicted, the vehicle cockpit 300 is divided into a plurality of gaze zones and each gaze zone corresponds to a specific portion of the vehicle cockpit towards which a driver may look while driving the vehicle associated with the vehicle cockpit 300. As shown, the vehicle cockpit 300 includes a first gaze zone 302 that corresponds to a driver side mirror 304, a second gaze zone 306 that corresponds to an instrument cluster 308, a third gaze zone 310 that corresponds to a head unit 312, a fourth gaze zone 314 that corresponds to a glove compartment 316, and a fifth gaze zone 318 that corresponds to a passenger size mirror 320.

As further illustrated, the vehicle cockpit 300 includes a sixth gaze zone 322 that corresponds to an upper driver side windshield view area 324, a seventh gaze zone 326 that corresponds to a rear-view mirror 328, and an eighth gaze zone 330 that corresponds to an upper passenger side windshield view area 332. Further, the vehicle cockpit 300 includes a ninth gaze zone 334 that corresponds to a middle driver side windshield view area 336, a tenth gaze zone 338 that corresponds to a middle central windshield view area 340, and an eleventh gaze zone 342 that corresponds to a middle passenger side windshield view area 344.

The vehicle cockpit 300 includes a twelfth gaze zone 346 that corresponds to a lower driver side windshield view area 348, a thirteenth gaze zone 350 that corresponds to a lower central windshield view area 352, and a fourteenth gaze zone 354 that corresponds to a lower passenger side windshield view area 356. FIG. 3 further indicates that the vehicle cockpit 300 includes a fifteenth gaze zone 358 that corresponds to a driver side window 360, a sixteenth gaze zone 362 that corresponds to a passenger side window 364, a seventeenth gaze zone 366 that corresponds to a driver side visor 368, and an eighteenth gaze zone 370 that corresponds to a steering wheel 372. The delineation of the various gaze zones allows the systems 100, 200 to determine the manner in which in-vehicle messaging, e.g., warnings, are displayed to a driver.

Figure 4:
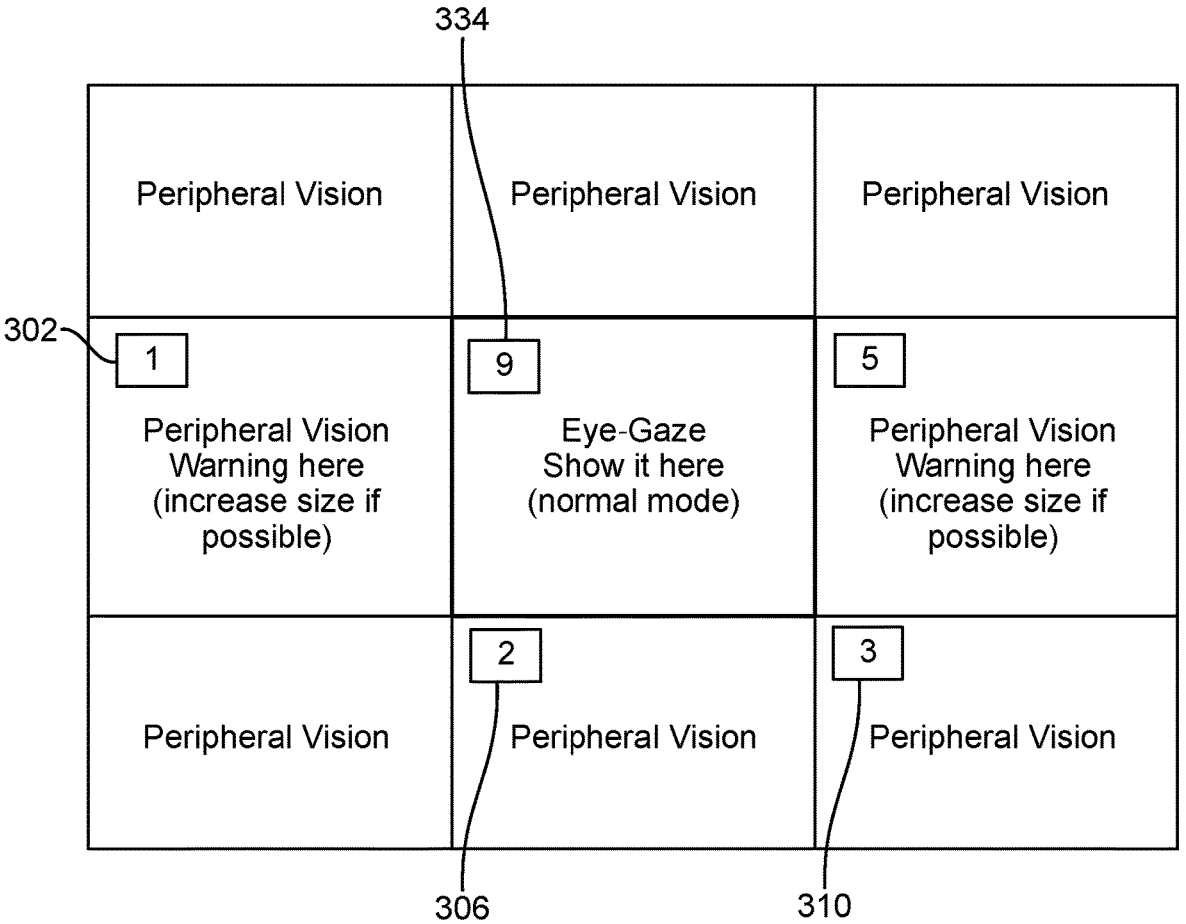
FIG. 4 is a diagram of line of sight and peripheral vision.

In one example, with reference to FIG. 4, if the system 100, 200 detects that the driver's gaze direction is in the ninth zone 334, e.g., through the middle driver side windshield view area 336, and a warning is displayed in the first gaze zone 302 or the fifth gaze zone 318 (e.g., via the side view mirrors 304, 320), the system 100, 200 can increase the size of the warning, increase the brightness of the warning, or change the color of the warning if the system 100, 200 does not detect that the gaze direction of the driver does not measurably switch to the first gaze zone 302. In another example, if a "low fuel" warning is displayed in the second gaze zone 306 or the third gaze zone 310 (e.g., via the instrument cluster 308 or the head unit 312), and the driver does not measurable switch his or her gaze direction to the second gaze zone 306 or the third gaze zone 310 for a predetermined, or user set, amount of time, the font size of the "low fuel" warning can be increased, the color of the "low fuel" warning can be change, the "low fuel" warning can blink, or the "low fuel" warning can be changed in some other manner. If the warning or message is displayed to the user in the gaze zone in which he or she is currently looking, e.g., the ninth gaze zone 334 (e.g., via a heads-up display), the warning or message is presented in a normal display mode. Accordingly, warnings and messages presented in the peripheral vision zones of driver are augmented if the driver does not change his or her gaze direction for a measurable amount of time—as determined by the system 100, 200.

One or more of the gaze zones 302, 306, 310, 314, 318, 322, 326, 330, 334, 338, 342, 346, 350, 354, 358, 362, 366, 370 are activation zones that have a vehicle function that can be activated by the driver looking in that activation zone for a predetermined period of time. For example, when the vehicle 102 is in a tow mode, or a trailer is detected, and the driver looks in the head unit 312 (in the third gaze zone 310) for a predetermined, or user set, period of time, while the vehicle is in reverse, the see-through trailer function may be activated when the driver gaze is directed to the rear-view mirror 328 (in the seventh gaze zone 326) and presented via a rear-view display in the rear-view mirror 328. In another example, when the driver moves his or her gaze to the twelfth gaze zone 346 that corresponds to a lower driver side windshield view area 348 for a predetermined, or user set, period of time, a heads-up display may be activated and presented to the driver in the twelfth gaze zone 346. Further, when the vehicle 102 is detected driving off road and the driver moves his or her gaze to the head unit 312 (in the third gaze zone 310) for a predetermined, or user set, period of time, a see-through hood function may be activated and presented via a display in the head unit 312.

Figure 5:
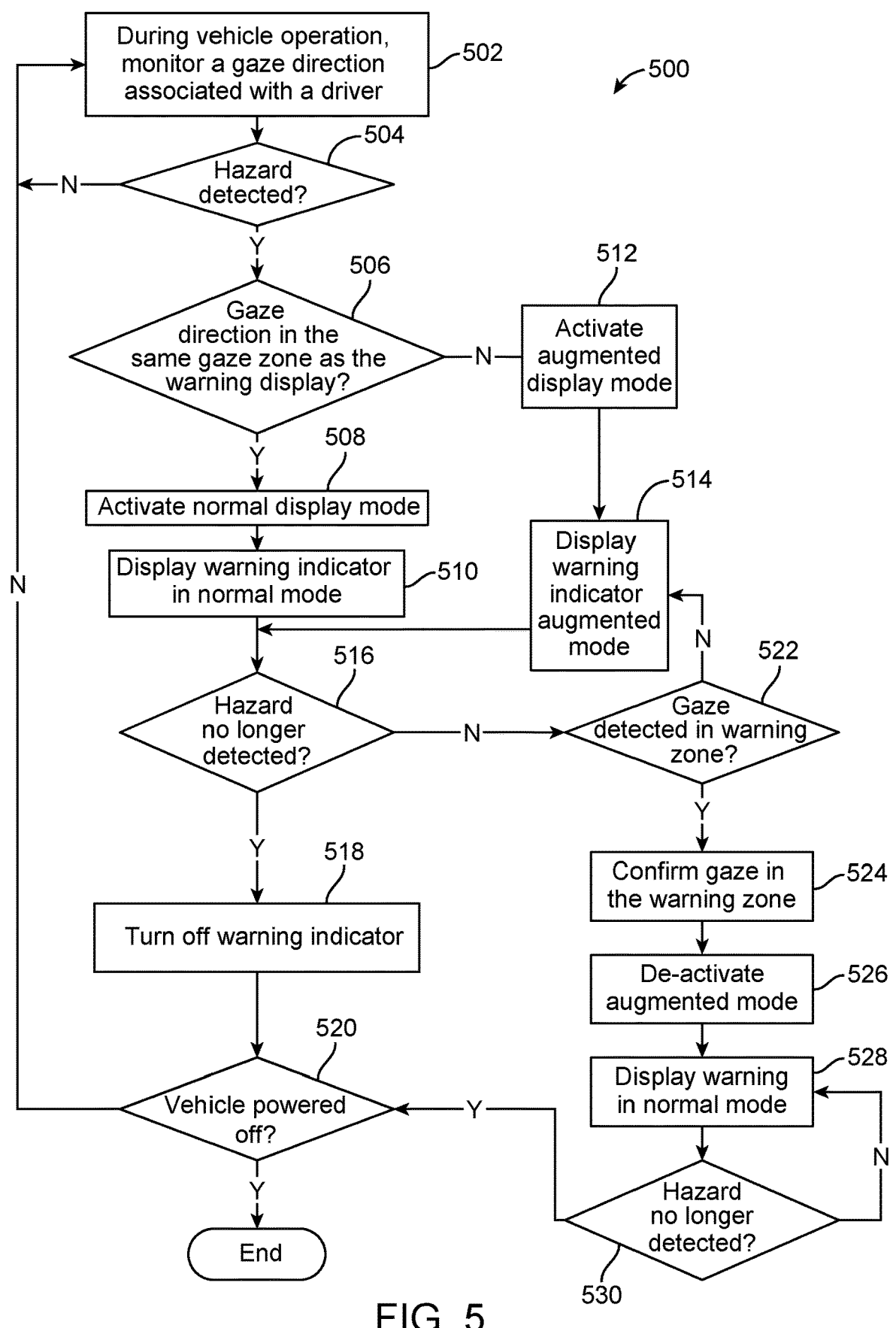
FIG. 5 is a flowchart illustrating an example method of displaying in-vehicle messaging based on driver gaze direction.

FIG. 5 is a flowchart illustrating an example method 500 of displaying in-vehicle messaging based on driver gaze direction. The steps of the method 500 are executable by the system 100 or the system 200. Beginning at step 502, during vehicle operation, the method 500 includes monitoring a gaze direction associated with a driver. For example, the gaze direction associated with the driver is monitored using the interior sensor 136, 240. At decision step 504, the method 500 determines whether a vehicle hazard is detected. In one example, the vehicle hazard is an external vehicle hazard, e.g., a vehicle detected in a blind spot, a pedestrian detected behind the vehicle, a pending forward collision, etc., and the hazard is detected using the exterior sensor 126, 230. In another example, the vehicle hazard is an internal vehicle hazard, e.g., low fuel, low oil, high engine temperature, low battery range, low tire pressure, etc., and the internal hazard is detected via a sensor. In yet another example, the vehicle hazard is a driver hazard, e.g., the driver is distracted.

If a hazard is not detected, the method 500 returns to step 502 and continues as described herein. On the other and, if a hazard is detected, the method 500 proceeds to decision step 506 and the method 500 includes determining if the driver gaze direction is in the same gaze zone as the gaze zone in which a hazard warning indicator is located, i.e., the gaze zone in which the warning indicator is primarily displayed or activated. If so, the method 500 proceeds to step 508 and includes activating a normal display mode for the warning indicator. Thereafter, at step 510, the method 500 includes displaying the warning indicator in the normal display mode.

Returning to decision step 506, if the gaze direction is not in the same gaze zone as the gaze zone in which the warning is displayed (i.e., the gaze direction is in a different gaze zone), the method 500 proceeds to step 512 and the method 500 includes activating an augmented display mode. In an example, the augmented display mode includes an increased size of the warning indicator, an increased brightness of the warning indicator, a color change of the warning indicator, an additional indicator around or adjacent the warning indicator, or any combination thereof. In the case that the driver is detected to be distracted (i.e., looking too long at a particular display), the augmented display mode includes locking out the display that is causing the distraction. For example, the driver gaze may be directed at the head unit for too long of a time, indicating that the driver is distracted. In such a case, the head unit may be locked out for the driver, but not a passenger. At step 514, the method 500 includes displaying the warning indicator augmented display mode.

From step 510 and step 514, the method 500 moves to decision step 516 wherein the method 500 includes determining whether the warning is no longer detected. If so, the method 500 proceeds to step 518 and includes turning off the warning indicator. Thereafter, the method 500 moves to decision step 520 and the method 500 includes determining whether the vehicle is powered off. If so, the method 500 ends. Otherwise, if the vehicle remains powered on, the method returns to step 502 and continues as described herein.

Returning to decision step 516, if the warning continues to be detected, the method 500 moves to decision step 522 in which the method 500 includes determining whether the driver gaze direction is detected in the same gaze zone as the gaze zone in which the warning is actively displayed. This would indicate that the driver has shifted the gaze in the direction of the displayed warning. If the gaze direction is not detected in the same gaze zone in which the warning is displayed, the method 500 returns to step 514 and continues as shown. Otherwise, if the gaze direction is detected in the same gaze zone in which the warning is actively displayed, the method 500 moves to step 514 and includes confirming that the driver gaze direction has shifted to the warning zone. This confirmation may be based on a length of time of the gaze direction remaining in the same gaze zone as the active warning. In one example, the length of time is greater than or equal to 1.0 seconds, such as greater than or equal to 1.25 seconds, greater than or equal to 1.5 seconds, greater than or equal to 1.75 seconds, greater than or equal to 2.0 seconds, greater than or equal to 2.25 seconds, greater than or equal to 2.5 seconds, greater than or equal to 2.75 seconds, or greater than or equal to 3.0 seconds. Further, in this example, the length of time is less than or equal to 5.0 seconds, such as less than or equal to 4.75 seconds, less than or equal to 4.5 seconds, less than or equal to 4.25 seconds, less than or equal to 4.0 seconds, less than or equal to 3.75 seconds, less than or equal to 3.5 seconds, less than or equal to 3.25 seconds, or less than or equal to 3.0 seconds. Further, the length of time can be within a range between and including any of the activation gaze durations described herein.

In another example, the length of time is greater than or equal to 0.125 seconds, such as greater than or equal to 0.25 seconds, greater than or equal to 0.375 seconds, greater than or equal to 0.5 seconds, greater than or equal to 0.625 seconds, greater than or equal to 0.75 seconds, greater than or equal to 0.875 seconds, or greater than or equal to 1.0 seconds. In this example, the length of time is less than or equal to 2.0 seconds, such as less than or equal to 1.875 seconds, less than or equal to 1.75 seconds, less than or equal to 1.625 seconds, less than or equal to 1.5 seconds, less than or equal to 1.375 seconds, less than or equal to 1.25 seconds, or less than or equal to 1.125 seconds. Further, the length of time can be within a range between and including any of the activation gaze durations described herein.

After the gaze direction is confirmed to be in the warning zone, the method 500 proceeds to step 526 and includes de-activating the augmented display mode. Then, at step 528, the method 500 includes displaying the warning in the normal display mode. Moving to decision step 530, the method 500 includes determining whether the warning is no longer detected. If so, the method 500 moves to decision step 520 and continues as described. Otherwise, the method 500 returns to step 528 and continues as described. Accordingly, the system 100, 200 is able to present various warnings in a normal display mode or an augmented display mode (designed to catch the driver attention) based on the gaze direction of the driver and whether the warning, or message, is presented to the driver in the line of sight of the driver or in the peripheral vision of the driver. Further, the system 100, 200 is able to determine whether the gaze direction shifts in the direction of the warning, or message, and when the gaze direction is shifted for a predetermined amount of time, the system 100, 200 can turn off an augmented display mode and return the warning indicator to a normal display mode or turn off the warning or message entirely.

Figure 6:
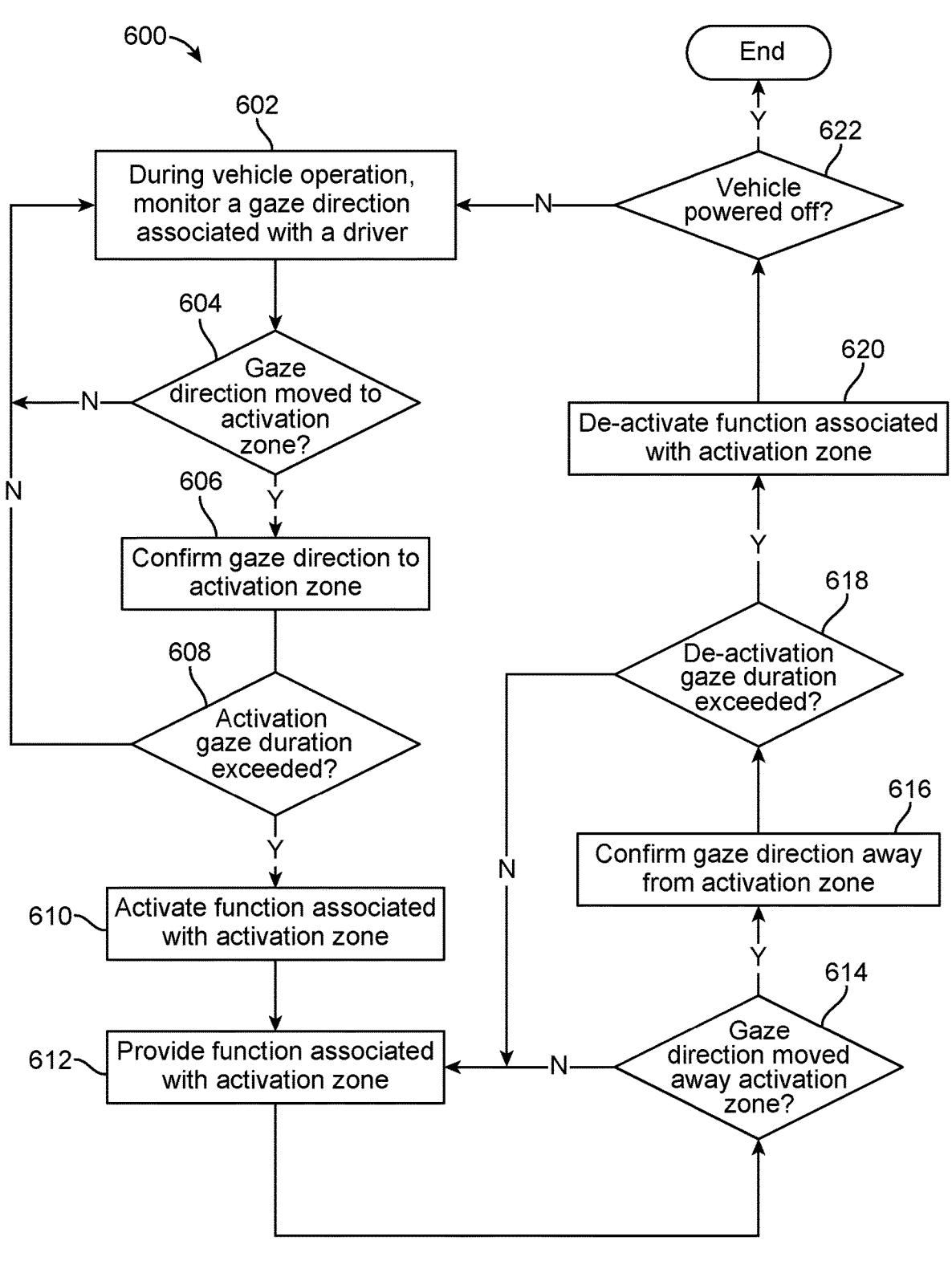
FIG. 6 is a flowchart illustrating an example method of activating vehicle functions based on driver gaze direction.

Referring now to FIG. 6, an example method 600 of selectively activating vehicle functions, or controlling vehicle operations, based on driver gaze direction is illustrated. The steps of the method 600 are executable by the system 100 or the system 200. Commencing at step 602, the method 600 includes monitoring a gaze direction associated with a driver during vehicle operation. For example, the gaze direction associated with the driver is monitored using the interior sensor 136, 240. At decision step 604, the method 600 determines whether the driver gaze direction is moved to an activation zone. It is to be understood that there may be more than one activation zone for a particular vehicle function. At decision step 604, if the gaze direction is not moved to an activation zone, the method 600 returns to step 602 and continues as described herein.

On the other hand, if the driver gaze direction is moved to an activation zone, the method proceeds to step 606 and the method 600 includes confirming that the gaze direction has moved to the activation zone. Moving to decision step 608, the method 600 includes determining whether an activation gaze duration is exceeded. In one example, the activation gaze duration is greater than or equal to 1.0 seconds, such as greater than or equal to 1.25 seconds, greater than or equal to 1.5 seconds, greater than or equal to 1.75 seconds, greater than or equal to 2.0 seconds, greater than or equal to 2.25 seconds, greater than or equal to 2.5 seconds, greater than or equal to 2.75 seconds, or greater than or equal to 3.0 seconds. In this example, the activation gaze duration is less than or equal to 5.0 seconds, such as less than or equal to 4.75 seconds, less than or equal to 4.5 seconds, less than or equal to 4.25 seconds, less than or equal to 4.0 seconds, less than or equal to 3.75 seconds, less than or equal to 3.5 seconds, less than or equal to 3.25 seconds, or less than or equal to 3.0 seconds. Further, the activation gaze duration can be within a range between and including any of the activation gaze durations described herein.

In another example, the activation gaze duration is greater than or equal to 0.125 seconds, such as greater than or equal to 0.25 seconds, greater than or equal to 0.375 seconds, greater than or equal to 0.5 seconds, greater than or equal to 0.625 seconds, greater than or equal to 0.75 seconds, greater than or equal to 0.875 seconds, or greater than or equal to 1.0 seconds. In this example, the activation gaze duration is less than or equal to 2.0 seconds, such as less than or equal to 1.875 seconds, less than or equal to 1.75 seconds, less than or equal to 1.625 seconds, less than or equal to 1.5 seconds, less than or equal to 1.375 seconds, less than or equal to 1.25 seconds, or less than or equal to 1.125 seconds. Further, the length of time can be within a range between and including any of the activation gaze durations described herein.

Returning to decision step 608, if the activation gaze duration is not exceeded, the method 600 returns to step 602 and the method 600 continues as described. Otherwise, if the activation gaze duration is exceeded, the method 600 moves to step 610 and the method 600 includes activating a function associated with activation zone. Thereafter, at step 612, the method 600 includes providing the function associated with activation zone.

At decision step 614, the method 600 includes determining whether the driver gaze direction is moved away from the activation zone or toward a pre-assigned de-activation zone. If not, the method 600 returns to step 612 and the method 600 continues to provide the function associated with the activation zone. Conversely, at decision step 614, if the driver gaze direction is moved away from the activation zone or toward a pre-assigned de-activation zone, the method 600 proceeds to step 616 and the method 600 includes confirming that the driver gaze direction is moved away from activation zone or toward a pre-assigned de-activation zone. Then, at decision step 618, the method 600 includes determining whether a de-activation gaze duration is exceeded. For example, the de-activation gaze duration is greater than or equal to 3.0 seconds, such as greater than or equal to 3.25 seconds, greater than or equal to 3.5 seconds, greater than or equal to 3.75 seconds, greater than or equal to 4.0 seconds, greater than or equal to 4.25 seconds, greater than or equal to 4.5 seconds, greater than or equal to 4.75 seconds, or greater than or equal to 5.0 seconds. In another example, the de-activation gaze duration is less than or equal to 8.0 seconds, such as less than or equal to 7.75 seconds, less than or equal to 7.5 seconds, less than or equal to 7.25 seconds, less than or equal to 7.0 seconds, less than or equal to 6.75 seconds, less than or equal to 6.5 seconds, or less than or equal to 6.25 seconds, or less than or equal to 6.0 seconds. Further, the activation gaze duration can be within a range between and including any of the activation gaze durations described herein.

Returning to decision step 618, if the de-activation gaze duration is not exceeded, the method 600 returns to step 612 and the method 600 includes continuing to provide the function associated with the activation zone. On the other hand, at decision step 618, if the de-activation gaze duration is exceeded, the method 600 moves to step 620 and the method 600 includes de-activating function associated with activation zone.

Thereafter, the method 600 moves to decision step 622 in which the method 600 includes determining whether the vehicle is powered off. If the vehicle is powered off, the method 600 ends. On the other hand, if the vehicle is not powered off, the method 600 returns to step 602 and continues as described herein. Accordingly, the system 100, 200 can activate and de-activate various vehicle functions based on the driver gaze direction and duration as monitored by the system 100, 200.

The systems 100, 200 and methods described herein, e.g., the method 500, leverage peripheral vision to improve attention on road. For example, the speed on the instrument cluster is enlarged (augmented display mode) when looking through the windshield (or looking in any zone, but the zone in which the instrument cluster is located), and returns to normal size (normal display mode) when the driver moves his or her gaze directly at the instrument cluster. The method 500 improves the likelihood of driver to notice important warnings. In another example, Further, blind spot mirror indicators are increased in size (augmented display mode) when the driver is not looking at them directly at them as indicated by the gaze direction. Moreover, new warnings are displayed larger (augmented display mode) on the instrument cluster, or other location, until the driver looks at the new warning for the first time as indicated by the driver gaze direction. In another example, warnings are presented at whatever screen the driver gaze direction is located at any given time in the augmented mode when first presented.

The method 500 can also be used to reduce driver distraction by delivering a distraction warning if the driver is looking too long at the center display or other screen not related to driving task and not looking forward out of the windshield in the direction of vehicle travel. Moreover, the system 100, 200 and method 500 can lock out a display screen if the driver is looking too long at the display screen or other screen not related to driving task. The system 100, 200 can also enable passenger to use potentially distracting features and lock out the driver. For example, if the driver gaze direction is directed out the windshield, or at another driving task related gaze zones, the passenger may be permitted to use the touchscreen on the head unit (center display) while the driver is prevented from using it. The system 100, 200 described above point can be supplemented with a wide field of view camera that also can monitor position of the driver and passenger hands. In this example, the system 100, 200 may detect that the driver's hands are not manipulating the display and allow the passenger to manipulate the display.

The method 600 provides automatic feature enablement and automatically activate vehicle functions, or features, based on driver gaze behavior. For example, a see-through trailer function is enabled if the vehicle is towing a trailer and the driver gaze direction is moved to the rear-view mirror for a predetermined, or user, set duration of time. Further, a see-through hood function may be activated if the vehicle is off road and the driver gaze is directed to a gaze zone aligned with a front or side edge of the vehicle hood. The system 100, 200 and method 600 can also provide automated parking assist when the driver is parking the vehicle and moves his or her gaze into an activation zone associated with automated parking assist. The system 100, 200 and methods 500, 600 may also improve smart glasses integration by show the driver relevant vehicle information (speed, nav, warnings) on the smart glasses while the driver gaze direction is directed in the same direction as the vehicle travel.

Thus, examples, aspects, and features herein provide, among other things, systems and methods for of displaying in-vehicle messaging and activating vehicle functions based on driver gaze direction.

The invention claimed is:

1. A system for controlling a vehicle operation based on a driver gaze direction, the system comprising:
    a plurality of sensors; and
    an electronic processor, the electronic processor configured to:
    determine a gaze direction of a driver using the plurality of sensors;
    determine a gaze zone of the driver based on the gaze direction;
    detect a vehicle hazard;
    activate a warning indicator associated with the vehicle hazard, wherein the warning indicator includes a normal display mode and an augmented display mode;
    determine a gaze zone in which the warning indicator is actively displayed;
    compare the gaze zone of the driver to the gaze zone in which the warning indicator is actively displayed;
    activate the normal display mode in response to determining that the gaze zone of the driver is in the same gaze zone as the gaze zone in which the warning indicator is actively displayed; and
    activate the augmented display mode in response to determining that the gaze zone of the driver is in a different gaze zone than the gaze zone in which the warning indicator is actively displayed.

2. The system of claim 1, wherein the electronic processor is configured to:
    determine when the gaze direction of the driver is moved to the same gaze zone as the gaze zone in which the warning indicator is actively displayed.

3. The system of claim 1, wherein the electronic processor is configured to:

de-activate the augmented display mode when the gaze direction of the driver is moved to the same gaze zone as the gaze zone in which the warning indicator is actively displayed.

4. The system of claim 1, wherein the electronic processor is configured to:

determine when the gaze direction is moved to an activation zone, the activation zone being associated with a functional feature of the vehicle; and determine when a gaze duration exceeds an activation duration.

5. The system of claim 4, wherein the electronic processor is configured to:

activate a function associated with the activation zone.

6. The system of claim 5, wherein the electronic processor is configured to:

determine when the gaze direction is moved away from the activation zone; and determine when a gaze duration exceeds a de-activation duration.

7. The system of claim 6, wherein the electronic processor is configured to:

de-activate the function associated with the activation zone when the gaze duration exceeds the de-activation duration.

8. The system of claim 1, wherein the vehicle hazard is detected using vehicle sensors.

9. The system of claim 1, wherein the vehicle hazard is an external hazard to the vehicle.

10. The system of claim 1, wherein the electronic processor is further configured to:

divide the vehicle into a plurality of gaze zones;

determine which of the plurality of gaze zones includes the warning indicator; and determine which of the plurality of gaze zones is in the gaze direction of the driver.

* * * * *